United States Patent
Cameron et al.

(12)

(10) Patent No.: US 6,282,049 B1
(45) Date of Patent: Aug. 28, 2001

(54) APPLYING A RAMPED VOLTAGE SOURCE ACROSS AN ACTUATOR COIL TO RETRACT A DISC DRIVE ACTUATOR

(75) Inventors: T. Jay Cameron, Aptos; Stanley H. Dinsmore, Concord, both of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 865 days.

(21) Appl. No.: 08/546,295

(22) Filed: Oct. 20, 1995

(51) Int. Cl.[7] .................................................. G11B 5/596
(52) U.S. Cl. ........................................... 360/75; 360/78.04
(58) Field of Search .................................. 360/75, 78.01, 360/78.04, 105

(56) References Cited

U.S. PATENT DOCUMENTS

| | | | |
|---|---|---|---|
| 4,679,102 | 7/1987 | Wevers et al. | 360/75 |
| 5,187,627 | 2/1993 | Hickox et al. | 360/105 |
| 5,224,000 | 6/1993 | Casey et al. | 360/105 |
| 5,262,907 | 11/1993 | Duffy et al. | 360/77.05 |
| 5,365,389 | 11/1994 | Jabbari et al. | 360/105 |

*Primary Examiner*—Andrew L. Sniezek
*Assistant Examiner*—K. Wong
(74) *Attorney, Agent, or Firm*—Crowe & Dunlevy (57) ABSTRACT

For low velocity retraction of a disc drive actuator during a parking operation, a system comprising a voltage generator circuit generates a plurality of discrete dc voltage levels, a timing circuit provides a series of timing pulses, and a selection circuit responsive to the voltage generator and timing circuit outputs a voltage profile of increasing voltage steps from the voltage levels and the timing pulses. The voltage profile is provided to a driver circuit that drives a voice coil motor which, in turn, positions the actuator with respect to the discs of the disc drive. The application of the voltage profile during the parking operation causes the driver circuit to act as a voltage source for the voice coil motor. External bias forces upon the actuator tending to force the actuator towards the park position generate a back EMF in the coil, opposing the voltage source of the driver circuit and the motion of the actuator towards the park position. The coil is thus velocity limited and the voltage profile is selected to bring the actuator to the park position at a terminal velocity sufficiently decreased as to generate acoustic noise below predetermined, acceptable limits.

14 Claims, 4 Drawing Sheets

APPLYING A RAMPED VOLTAGE SOURCE ACROSS AN ACTUATOR COIL TO RETRACT A DISC DRIVE ACTUATOR

BACKGROUND OF THE INVENTION

1. Field of the Invention

This invention relates generally to the field of disc drive data storage devices, and more particularly, but not by way of limitation, to a method and apparatus for providing low velocity retraction of an actuator through application of an exponentially ramped voltage to a disc drive voice coil motor.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted for movement to an electronically controlled actuator mechanism.

Presently, the most commonly used type of actuator mechanism is the rotary voice coil actuator, which employs a voice coil motor. With this type of actuator, the heads used to write and read data are mounted via flexures at the ends a plurality of arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is parallel with the axis of rotation of the spindle motor and the discs and the heads move in a plane parallel with the surfaces of the discs.

The actuator voice coil motor includes a coil mounted on the side of the actuator body opposite the head arms so as to be immersed in the magnetic field of an array of permanent magnets. When controlled DC current is passed through the coil, a magnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Control of the movement of the heads is achieved with a closed loop servo system such as disclosed in U.S. Pat. No. 5,262,907 entitled HARD DISC DRIVE WITH IMPROVED SERVO SYSTEM, issued to Duffy, McKenzie, Heydari and Woods, assigned to the assignee of the present invention and incorporated herein by reference. In such a system, position or servo information is prerecorded on at least one surface of one of the discs. The servo system can be either a dedicated servo system, in which servo information is provided on a dedicated servo disc surface, or an embedded servo system, in which servo information is interleaved with user data on all the disc surfaces.

At such times that the disc drive is not in use, the heads are usually "parked", or moved to a position over a designated park zone which is generally at an inner radius of the discs. Heads are generally parked in response to a loss of power to the drive, or in response to a "sleep" command which is issued to conserve power, an important consideration for drives used in portable computers. In order to park the heads, a current is provided to the coil in order to move the actuator across the disc and over the park zone, where a latch is provided to secure the actuator. Typical latching arrangements are disclosed by U.S. Pat. No. 5,187,627 entitled MAGNETIC LATCH AND CRASH STOP, issued to Hickox and Stram, U.S. Pat. No. 5,224,000 entitled CRASH STOP AND MAGNETIC LATCH FOR A VOICE COIL ACTUATOR, issued to Casey and West, and U.S. Pat. No. 5,365,389 entitled CRASH STOP AND MAGNETIC LATCH, issued Nov. 15, 1994 to Jabbari and Tafreshi, all of these references being assigned to the assignee of the present invention and incorporated herein by reference.

It is generally desirable to park the heads quickly, as the power to park the heads at the time of a power loss is typically provided from the back EMF of the spindle motor; that is, after a loss of power, the spindle motor is used as a generator as it continues to spin due to inertia. As areal densities increase and the size of the discs continue to decrease, the amount of power available from the inertia of the spinning spindle motor after power down will continue to decrease, making expeditious parking of the heads an even more important consideration in the future. The general use of the spindle motor back EMF to provide power used during a disc drive shut down sequence is discussed in U.S. Pat. No. 4,679,102 entitled METHOD AND MEANS FOR PARKING READ/WRITE HEADS IN A DISC DRIVE USING THE BACK-EMF OF THE SPINDLE MOTOR TO OPERATE A STEPPER MOTOR, issued to Wevers, Krause and Battu, assigned to the assignee of the present invention and incorporated herein by reference.

Additionally, the heads are typically supported over the discs by an air-bearing surface generated by the rotation of the discs and this air-bearing surface will be lost once the rotational speed of the discs is sufficiently decreased. Typically, the heads are parked by applying a DC current pulse to the coil in order to move the actuator to the park position. The duration and magnitude of the current pulse are selected in order to ensure the heads are reliably parked from any position on the disc, including the outermost radius of the disc.

While it is desirable to park the heads quickly, attendant problems have been observed when the actuator is moved too rapidly during parking. Particularly, the application of a current pulse to the voice coil motor to park the heads can result in significant acceleration of the heads towards the park position, culminating in undesirable acoustic noise as the actuator contacts a limit stop or magnetic latch. Further, the sudden deceleration of the actuator upon contact with the limit stop can subject the heads to uncontrolled mechanical motion and vibration, which can damage the heads, the actuator arms and the disc media. With the advent of smaller, more complex head designs, such as MR and GMR heads, reducing mechanical motion and shock to the heads will continue to be desirable in the future.

Uncontrolled bias forces, if not compensated, can compound the problems associated with the parking of the heads. Aerodynamic forces on the heads as well as bias forces from a flex circuit connected to the actuator (to provide both data signal and drive signal paths) vary across the disc radius and may cause additional acceleration of the heads toward the park position, causing additional acoustic noise and head motion when the actuator is parked. Further, electrical and mechanical tolerances in the components used in the actuator and associated control circuitry can also result in variations in parking characteristics from drive to drive, which can require individual turning of drives during manufacturing to provide acceptable parking characteristics.

SUMMARY OF THE INVENTION

The present invention provides a method and apparatus for providing a low velocity retraction of a disc drive actuator during a parking operation. The apparatus comprises a voltage generator circuit for generating a plurality of discrete dc voltage levels, a timing circuit for providing a series of timing pulses, and a selection circuit responsive to the voltage generator and timing circuit that outputs a voltage profile of increasing voltage steps from the voltage levels and the timing pulses.

The voltage profile is provided to a driver circuit that drives a voice coil motor which, in turn, positions the actuator with respect to the discs of the disc drive. The application of the voltage profile during the parking operation causes the driver circuit to act as a voltage source for the voice coil motor. External bias forces upon the actuator tending to force the actuator towards the park position generate a back EMF in the coil, opposing the voltage source of the driver circuit and the motion of the actuator towards the park position. The actuator is thus velocity limited and the voltage profile is selected to bring the actuator to the park position at a terminal velocity sufficiently decreased as to generate acoustic noise and motion below predetermined, acceptable limits.

In one embodiment to be described below, the voltage profile comprises eight discrete voltage levels from 0 to 320 millivolts. In another embodiment to be described below, the voltage profile comprises two discrete voltage levels, 160 and 320 millivolts.

An object of the present invention is to provide a method and apparatus for providing low velocity retraction of a disc drive actuator during a parking operation.

Another object of the present invention, while achieving the above stated object, is to provide a method and apparatus that generates and outputs a voltage profile of increasing voltage to a disc drive voice coil motor circuit during a parking operation.

Still another object of the present invention, while achieving the above stated objects, is to provide the voltage profile such that the velocity of the actuator upon reaching the park position results in acoustic noise and mechanical motion of the actuator that are below predetermined, acceptable limits.

Another object of the present invention, while achieving the above stated objects, is to compensate for external bias forces upon the actuator that tend to accelerate the actuator towards the park position.

Yet another object of the present invention, while achieving the above stated objects, is to compensate for significant amounts of mechanical and electrical offsets within the system.

Other objects, advantages and features of the present invention will be apparent from the following description when read in conjunction with the drawings and appended claims.

DESCRIPTION

Figure 1:
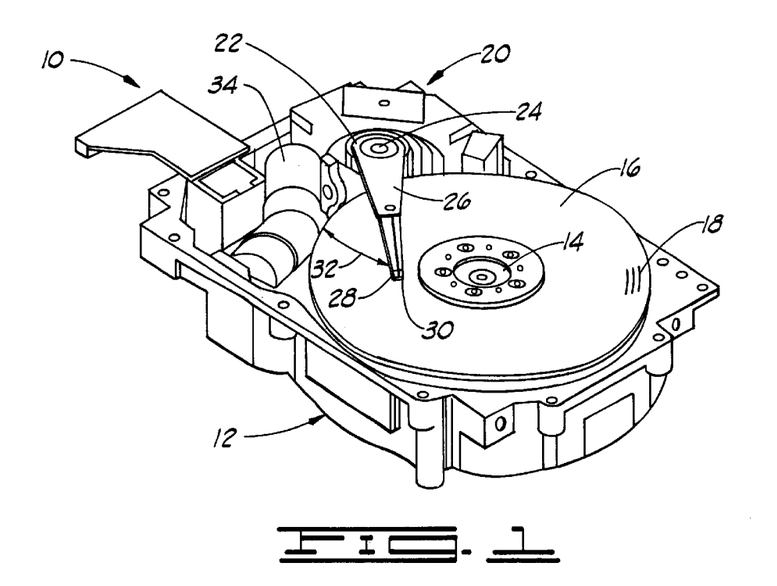
FIG. 1 is a perspective view of a disc drive in which the present invention is particularly useful.

Turning now to the drawings and more particularly to FIG. 1, shown is a perspective view of a disc drive 10 of the type in which the present invention is particularly useful. The disc drive 10 includes a housing base 12 and a top cover (not shown) which cooperatively engage to form a sealed housing which serves to protect delicate internal components from external contamiants.

A plurality of discs 16 are mounted for rotation on a spindle motor hub 14 using a disc clamp (not designated). An array of heads (one shown at 30) is mounted via head arms 26 which are part of an actuator body 22 which is adapted for pivotal motion about a pivot shaft 24 under control of a voice coil motor, shown generally at 20.

The voice coil motor (VCM) 20 is driven by electronic circuitry (not shown in FIG. 1) to controllably move the heads 30 to any desired one of a plurality of concentric circular tracks 18 on the discs 16 along arcuate path 32. At such time that the heads 30 are to be "parked", the heads 30 are moved to a position towards the innermost radius of the disc 16 and the actuator body 22 is latched in position by way of a conventional latching arrangement (not shown).

Thus, for the disc drive 10 of FIG. 1, a "park zone" (not designated in FIG. 1) is established at the innermost radius of the discs 16 so that, when the spindle motor hub 14 is not rotating the discs, the heads 30 are moved so as to rest on this park zone, preventing mechanical damage to the data recording surface of the discs 16 and to the heads 30. It will be recognized, of course, that the park zone could be located elsewhere, such as a position towards the outermost radius of the discs 16, but for purposes of discussion the park zone will be considered to be located towards the innermost radius.

Figure 2:
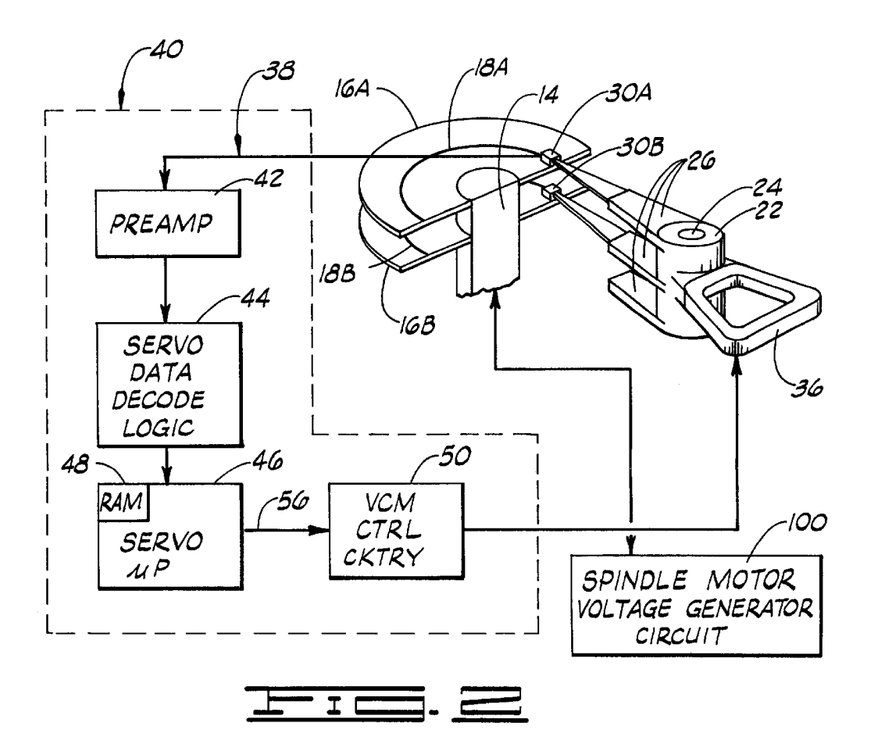
FIG. 2 is a block diagram of a servo system constructed in accordance with the present invention, used to control the actuator of the disc drive of FIG. 1.

Signals used to control the VCM 20, as well as signals to and from the heads 30, are passed via a flex circuit 34. Control of the VCM 20 is provided by a servo system, as shown in FIG. 2, which provides a simplified block diagram of a typical servo system in which the present invention is particularly useful. Shown in FIG. 2 is the actuator body 22 of FIG. 1 which pivots about the pivot shaft 24 when drive current is applied to a coil 36 which lies between a pair of permanent magnets (not shown in FIG. 2). On the opposite side of the actuator body 22 from the coil 36 is shown the head arms 26 which supports the heads (two of which are designated as 30A, 30B) which are arrayed to cooperate with the discs (designated as 16A, 16B) mounted for rotation on the spindle motor hub 14. While, in actual disc drives, there could be a larger number of discs, and a head associated with each disc surface, for purposes of clarity, only two discs 16A, 16B and two heads 30A, 30B are shown.

For this and the following discussion, it will be assumed that the disc drive 10 of the present discussion employs a dedicated servo system, so that the top head 30A is a servo head and the top surface of the top disc 16A is a servo disc that contains prerecorded positional servo information. All other heads and discs will be referred to as "data heads" or "read/write heads" and "data discs", respectively. It will be recognized, however, that the present invention is not dependent upon the use of a particular type of servo system, and that the present invention could be utilized in a disc drive employing an embedded servo system.

As will be recognized, the basic principle of operation of the servo system is that, if the servo head 30A can be made to seek to and follow a given servo track 18A on the servo disc 16A, all data heads 30B will simultaneously seek to and follow corresponding data tracks 18B. To facilitate this seeking and track following, servo data read from the servo disc 16A is directed by way of signal path 38 into a servo loop 40 which includes a preamplifier block 42, servo data decode logic 44 which includes an analog-to-digital (A/D) converter (not separately shown), a servo microprocessor 46 with associated RAM 48 and a VCM control circuit 50, which includes a power amp and a digital-to-analog (D/A) converter (both of which are not separately shown). A more detailed description of the operation of the servo loop 40 can be found in the previously incorporated Duffy et al. reference, U.S. Pat. No. 5,262,907, but generally, the servo loop of FIG. 2 controls the position of the heads 30A, 30B with respect to the discs 16A, 16B.

Figure 3:
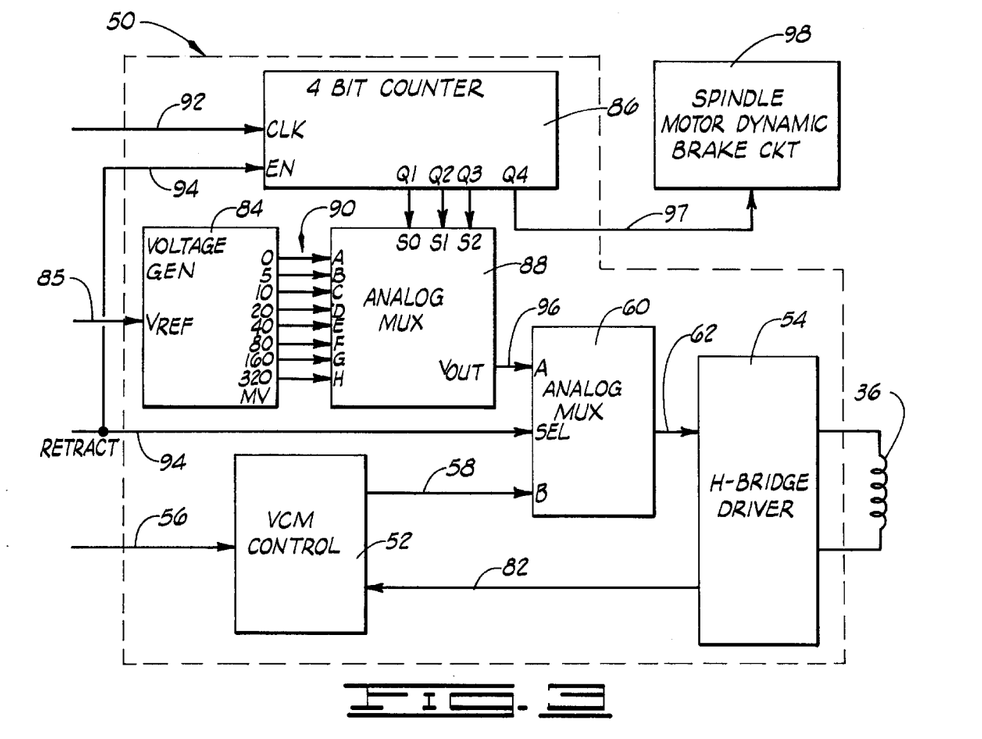
FIG. 3 is a block diagram of the VCM control circuitry of FIG. 2, showing a first embodiment of the apparatus of the present invention.

As described above, the present invention provides an improved apparatus and method for parking the heads, and FIG. 3 shows the VCM control circuit 50 of FIG. 2 and contains circuitry for implementing the preferred embodiment of the present invention. Before describing the construction and operation of the circuitry of FIG. 3, however, it may be helpful at this time to first provide an overview of the present invention, as first embodied in FIG. 3.

The present invention comprises parking an actuator through the application of a voltage profile of timed voltage steps of increasing value to an h-bridge driver circuit used to drive the actuator VCM coil. More particularly, the h-bridge driver circuit is configured during the parking operation so as to act as a voltage source for the coil in which incrementally larger amounts of voltage are applied across the coil. In this way, the h-bridge driver circuit sets and maintains the voltage across the coil as the coil passes through the magnetic field provided by the permanent magnets, regardless of the magnitude and direction of the current that flows through the coil. It will thus be noted that during the park operation, the circuit is operated in an open loop condition in comparison to the closed loop condition used during normal drive operation.

For disc drives having a design such that bias forces on the actuator (such as from windage and from the flex circuit) tend to force the actuator inwardly towards the parking zone, during a parking operation these forces will tend to cause the actuator to try to accelerate towards the parking zone at a rate faster than provided for by the voltage source as the actuator is being parked. However, the additional acceleration of the coil caused by the bias forces will cause the generation of a back EMF in the coil which will oppose this acceleration of the actuator. The voltage source will thus limit the velocity of the actuator and act as a dynamic brake, forcing the actuator to follow an acceptable velocity trajectory into the park position.

On the other hand, if the design of the disc drive is such that the bias forces tend to force the actuator outwardly from the parking zone (either across the entire disc or only at certain radiuses on the disc until a null point is reached), then the increasing voltage profile will be applied to the coil until sufficient force is provided to the actuator to overcome the outward bias forces and move the actuator to the park position. When the bias forces are outwardly directed across the entire disc surface, the gradual application of the voltage across the coil will ensure the actuator reaches the park position at an acceptable velocity. On the other hand, as is more typical, when the bias forces are inwardly directed for some portion of the disc surface and then outwardly directed at a second portion inside the first portion, the voltage profile will operate to limit the effects of the inwardly directed bias forces until a null point is reached; then, the voltage profile will provide sufficient force to the actuator to overcome the outward bias forces and continue to move the actuator towards the park position at an acceptable velocity.

Of course, a different voltage profile is developed for each of the above cases. However, in each case, the heads will generally be parked before all the voltages in the profile have been applied to the coil, and this will be a function of not only the bias forces upon the actuator, but also the mechanical and electrical offsets in the disc drive as well as the initial position of the heads at the start of the parking operation. Nevertheless, to ensure the heads are always parked correctly, the maximum voltage in the profile (that is, the last step voltage) is chosen so as to provide at least the minimum amount of current specified for the coil in order to park the heads. These and other considerations will be explained in detail below in conjunction with a description of the construction and operation of the presently preferred embodiments of the present invention, as follows.

Referring again to FIG. 3, shown therein is the VCM control circuit 50 of FIG. 2, which includes a conventional VCM control block 52 that provides normal closed-loop operational control of the coil 36 by way of a conventional h-bridge driver circuit 54. More particularly, during normal operation of the disc drive (that is, during all operations other than a head parking operation which is initiated upon receipt of a RETRACT command), with reference to FIG. 2, the servo microprocessor 46 determines the necessary current magnitude and polarity that should be applied to the coil 36, and provides a representative digital signal on signal path 56 to the VCM control block 52. The VCM control block 52 converts the digital signal to analog and provides, by way of a power amplifier (not shown), an analog signal on signal path 58 to an analog multiplexer 60 (hereinafter "mux"). More discussion concerning the analog mux 60 will be provided below, but during normal operation of the disc drive, the analog mux 60 connects the signal path 58 to an output signal path 62, which is provided as an input to the h-bridge driver circuit 54.

Figure 4:
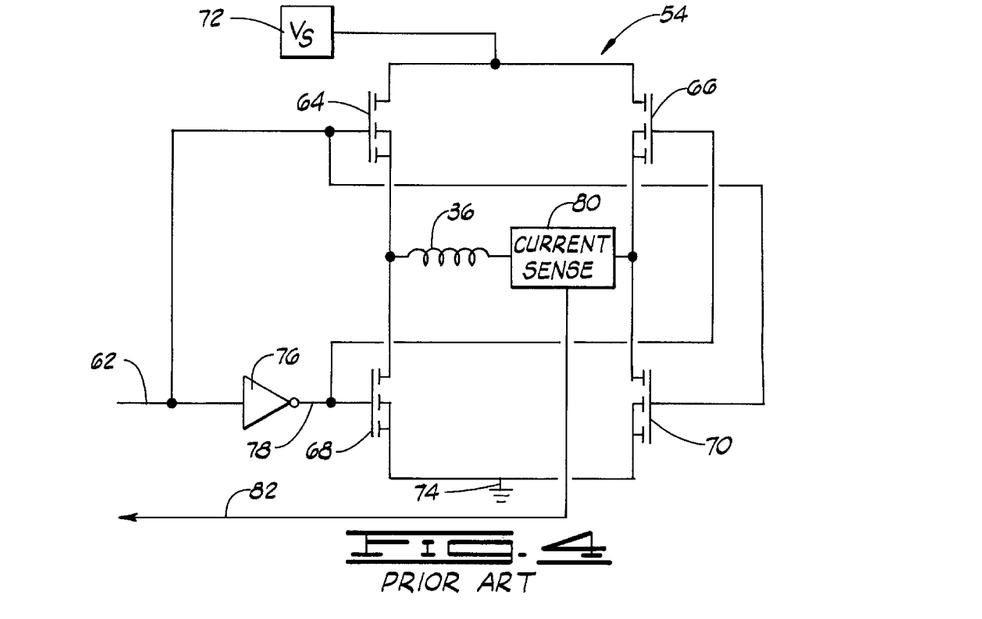
FIG. 4 is a block diagram of the h-bridge driver circuitry of FIG. 3, and also shows the coil of FIGS. 2 and 3.

Turning to FIG. 4, shown therein is a schematic block diagram of the h-bridge driver 54, which provides the desired current to the coil 36 by way of FETs 64, 66, 68 and 70, a voltage source 72 (providing a voltage Vs), and a ground connection 74. As shown in FIG. 4, the signal on signal path 62 from the analog mux 60 of FIG. 3 is provided to the gates of FETs 64 and 70. At the same time, the signal on signal path 62 is inverted by an inverting amplifier 76 so that an inverted signal is applied to the gates of FETs 66 and 68 by way of signal path 78. In this way, current can be caused to flow from the voltage source 72, through either FET 64 or 66 (depending upon the polarity of the signal from path 62), through the coil 36, through the corresponding FET 68 or 70, and then to ground 74. Of course, the magnitude of the current flowing through the coil 36 is determined by the magnitude of the voltage applied to the pairs of FETs 64 and 70 or 66 and 68, respectively.

Additionally, the circuit of FIG. 4 is shown to include a current sense block 80, which senses the current passing through the coil 36 and, in response thereto, provides a current sense signal on signal path 82 back to the VCM control block 52 of FIG. 3. The current sense block 80 of FIG. 4 provides conventional current sensing without otherwise interfering with the normal operation of the circuit of FIG. 4. For reference, the current sense block 80 may be implemented in a variety of ways, including the use of a current sense resistor in conjunction with a comparator or using a current mirror arrangement, both of which are well known in the art. As will be described in more detail below, current sensing is specifically not used during the parking operation of the present invention.

It will thus be recognized by those skilled in the art that, during normal operation, the disc drive of the present invention employs a conventional VCM control arrangement with a conventional h-bridge to control the current passing through the VCM coil. It will further be recognized that the h-bridge driver circuit illustrated in FIG. 4 has been greatly simplified and that additional components, such as a voltage sense circuit and protection components may be commonly employed, but are not shown therein. However, the h-bridge driver circuit as shown is sufficiently detailed to explain the operation of the preferred embodiments of the present invention, the first of which will now be discussed with reference again to FIG. 3.

FIG. 3 shows, in addition to the elements described thus far, a voltage generator circuit 84, a four-bit counter 86, and an analog mux 88 having eight inputs (designated as A through H), three select inputs (designated as S0, S1 and S2) and one output (designated as Vout). Particularly, the voltage generator circuit 84 receives a reference voltage (designated as Vref) on signal path 85 and generates a plurality of voltage levels. The reference voltage Vref can be any available disc drive voltage sufficient to generate the desired output voltages. In the embodiment presented, the voltage generator circuit 84 generates eight voltages at 0, 5, 10, 20, 40, 80, 160 and 320 millivolts, as shown. Voltage generator circuits are well known in the art and may be implemented in a variety of ways, including the use of a resistive ladder network. As shown in FIG. 3, the eight voltages generated by the voltage generator circuit 84 are provided as outputs which are correspondingly connected to the eight inputs of the analog mux 88 by way of eight signal paths (designated collectively in FIG. 3 as item 90).

Also having connections to the select inputs of the analog mux 88 is the counter 86, which is shown to have outputs Q1, Q2, Q3 and Q4, with Q1 being the least significant output bit and Q4 being the most significant output bit. Outputs Q1, Q2 and Q3 are connected as shown to the select inputs S0, S1 and S2, respectively, of the analog mux 88. The counter 86 receives a clock input from signal path 92 and an enable input from the RETRACT signal on signal path 94, both of which will be discussed more fully below. Thus, as will be recognized, once the counter 86 is enabled, it will begin counting at a frequency determined by the clock input and output an increasing digital count on outputs Q1 through Q4.

Returning to the analog mux 88, the output Vout is provided by way of a signal path 96 to an "A" input of the analog mux 60, and the signal path 94, which as described above provides the RETRACT signal as an enablement signal to the counter 86, also provides the RETRACT signal as a select input to the analog mux 60.

Having concluded a brief description of the construction of the circuitry of FIG. 3, operation of the circuitry will now be discussed. As provided hereinabove, during normal operation of the disc drive the VCM control block 52 (in conjunction with the rest of the servo loop of FIG. 2) provides closed-loop control of the actuator position. To accomplish this, the RETRACT signal on signal path 94 is at a state such that the analog mux 60 connects the "B" input from signal path 58 (providing the output of the VCM control block 52) to output signal path 62 and on to the h-bridge driver circuit 54. However, upon receipt of a RETRACT command, the VCM control block 52 is switched out of the circuit and is not used during a head parking operation, as described below.

Particularly, during disc drive operation a RETRACT command (to retract the actuator) will be generated upon the occurrence of certain conditions, such as (but not limited to) a loss of power, the detection of a serious failure condition or error, or the receipt of a "sleep" command. As discussed above, it is desirable to park the heads in an expeditious manner once the computer has been turned off or when a failure condition has been detected. Similarly, to conserve battery life, many portable computers provide a sleep option that shuts down spindle motor operation (either by the user or on a time-out basis). The present invention, of course, does not depend upon the circumstances surrounding a RETRACT command, but simply begins operation once such a command is received.

At such time that a RETRACT command is issued after the occurrence of any of the above described conditions, with reference to FIG. 3, a signal is provided on signal path 94, which enables the counter 86 and instructs the analog mux 60 to connect input signal path 96 to output signal path 62. Once enabled, the counter 86 begins counting upward at the frequency provided from the clock input, and outputs the incremental count to the select inputs S0, S1 and S2 of the analog mux 88. The first eight counts of the counter 86 will thus cause the analog mux 88 to sequentially select each of the input voltages provided by the voltage generator circuit 84 to inputs A through H, so that the signal path 96 is presented with a voltage of 0 mV for the first clock period, 5 mV for the second clock period, and so on through the remaining voltages. Setting the duration of each clock period (as well as the number and value for the voltages applied within each) depends upon a variety of factors, including the mechanical and electrical construction of the disc drive, and additional discussion concerning the tailoring of a voltage profile for a disc drive will be provided below. For the present example, however, each of the eight clock periods is on the order of 100 milliseconds (providing a maximum time over which to park the heads of about 800 milliseconds). Such a relatively "slow" clock may be obtained by the use of one or more divider circuits (not shown) in conjunction with a system clock, and the use of such techniques is well known in the art. Of course, during a power shut down condition, as described above the power provided to the circuit is generated from the spindle motor by way of a spindle motor generator circuit 100, as represented in FIG. 2. Such spindle motor generator circuits 100 are well known in the art and operate to provide a rectified DC voltage level capable of sustaining the operation of the circuitry long enough to properly park the heads and shut down the disc drive. For additional discussion, reference may be made to the previously incorporated Wevers et al. reference, U.S. Pat. No. 4,679,102.

As the RETRACT signal on signal path 94 causes the analog mux 60 to connect the "A" input to the output on path 62, the voltages placed on signal path 96 by the analog mux 88 are provided to the h-bridge driver circuit 54. With reference to FIG. 4, the voltages on signal path 62 are applied to the appropriate pair of FETs, either 64 and 70 or 66 and 68, depending on the orientation of the coil (the FETs chosen, of course, will be those which cause the coil to move inwardly towards the park zone). It will be recognized that, although the h-bridge driver circuit during normal operation acts as a current source for the coil, so that the current through the coil is maintained regardless of the voltage across the coil, this is not the case during the head parking operation; rather, the h-bridge during the parking operation acts as a voltage source, so that the voltage across the coil is maintained regardless of the current that flows through the coil.

As the sequence of voltages are provided to the FETS, the actuator will initially begin accelerating the heads toward the park zone. However, inwardly directed bias forces on the actuator (including windage and flex circuit forces) will cause the coil to accelerate even faster through the magnetic field of the permanent magnets beyond that which was induced initially by the voltage source. This additional acceleration through the magnetic field will generate a back EMF in the coil that will be counterbalanced by the voltage provided by the voltage source of the h-bridge. The net effect is that, as the voltages are increasingly applied to the FETs, the coil will be velocity limited and will cause the heads to arrive at the park zone at a velocity within predetermined, desired limits.

It will be recognized that the heads will be effectively parked at some point during the parking operation, not necessarily at the conclusion of the clock intervals (i.e., the eighth interval for the circuit of FIG. 3). Rather, depending on the electrical and mechanical construction of the disc drive, as well as the location of the heads relative to the disc surface at the time the RETRACT command is issued, the actuator may reach the park position and become latched well before the end of all the clock intervals. In fact, this is one of the benefits of the present invention, as it will compensate for a wide variety of variations among a population of nominally identical disc drives, including significant amounts of electrical and mechanical offsets as well as head positions.

Once the actuator reaches the park position, the operation of the circuit of FIG. 3 will continue to drive the actuator inwardly, minimizing the effects of bouncing as the actuator engages a limit stop or other latching arrangement. Further, as shown in FIG. 3, it will be recognized that the Q4 output of the counter 86, which is provided on signal path 97, can be used if desired to cause activation of a spindle motor dynamic brake circuit 98 by activating appropriate spindle driver circuitry (not shown). Such spindle motor dynamic brake circuits are well known in the art and serve to halt further rotation of the spindle motor hub (14 in FIGS. 1 and 2) by instructing the spindle motor driver circuitry to effectively short the multiple phases of the spindle motor together.

Figure 5:
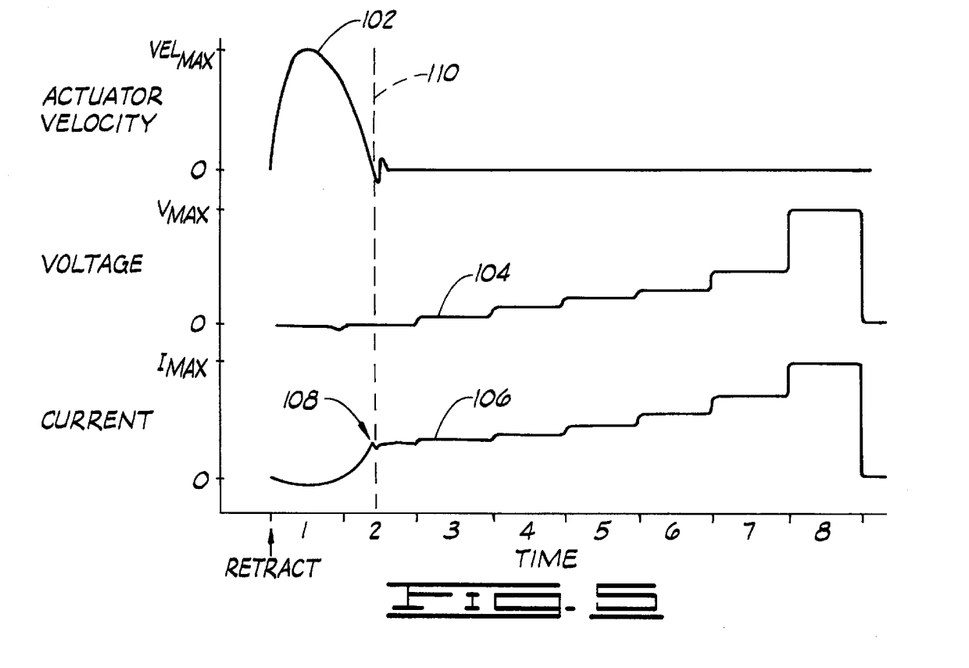
FIG. 5 is a graphical representation of the velocity of the actuator of FIG. 2 as well as voltage and current waveforms passing through the coil of FIGS. 2–4 during a head parking operation for a particular four disc, 2.5" diameter disc drive.
Figure 6:
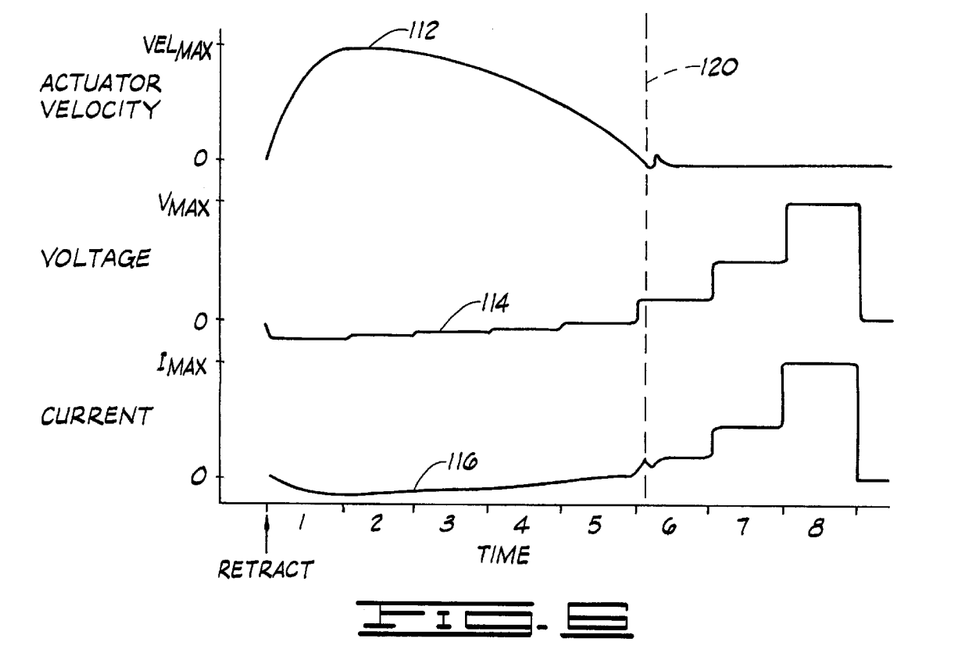
FIG. 6 is a graphical representation of the velocity of the actuator of FIG. 2 as well as voltage and current waveforms passing through the coil of FIG. 3 during a head parking operation for another four disc, 2.5" diameter disc drive having characteristics different from the disc drive of FIG. 5.

To further illustrate the operation of the circuit of FIG. 3, FIGS. 5 and 6 have been provided which show graphical representations of head velocity, coil voltage and coil current during a park operation for two particular disc drives (of the same model type) having somewhat different electrical and mechanical characteristics. For reference, the drives represented in FIGS. 5 and 6 are 2.5" diameter, four disc systems in which bias forces tend to force the actuators towards the park position at all disc radiuses. These drives have relatively large spindle inertias, flex circuit biases and radial force components from head aerodynamic effects. Beginning with FIG. 5, shown therein is a velocity curve 102, a net voltage curve 104 and a net current curve 106 plotted over a common x-axis representing time elapsed during a parking operation. The x-axis is shown to have 8 divisions, with each division corresponding to one of the eight clock intervals comprising the parking operation described above. More particularly, with reference to FIG. 3, the first division of FIG. 5 represents the clock interval during which the analog mux 88 outputs 0 mV, the second division represents the clock interval during which 5 mV is outputted by the mux, and so on for the remaining divisions. It will be recognized that these curves have been smoothed and are shown as approximations, neglecting low level effects (such as from noise) that would be observed from actual, unfiltered measurements.

For the disc drive corresponding to FIG. 5, it will be noted that the heads are positioned at the outermost radius of the discs before the head park operation begins at the first division (division number 1) in response to the RETRACT command, so that during the park operation, the actuator moves a maximum distance as it sweeps across the discs. As depicted by the velocity curve 102, at the beginning of the head park operation, the heads accelerate towards the park zone and then quickly decelerate, reaching the park position designated by a dotted line 110 about halfway into the second division.

Examination of the voltage curve 104 during the parking of the actuator reveals that only a nominal amount of voltage is applied to the h-bridge driver; however, the current curve 106 shows that a relatively significant amount of current actually flows in a negative direction through the coil during this same period. As further shown in FIG.5, a discontinuity 108 is shown in the current curve 106 at the point of contact (dotted line 110), indicating a slight oscillation of current (and representing a small amount of bouncing of the actuator upon contact). From the graph, after the actuator reaches the park position and is latched, the voltage curve 104 and the current curve 106 for the remaining divisions 3–8 are closely correlated, and the velocity curve 102 shows no motion of the actuator during this time.

Finally, FIG. 5 shows the voltage curve 104 to have a voltage of near 0 mv at the beginning of division 1, indicating that the electrical offset as measured for the circuitry from the voltage generator circuit 84 of FIG. 3 to the coil 36 of FIG. 4 is essentially nominal. The same is not true for the electrical offset of the disc drive considered in FIG. 6, which as described below will be shown to have a significant amount of negative offset.

Turning now to FIG. 6, shown therein is a similar graph as presented in FIG. 5; particularly, FIG. 6 provides a graphical representation of a velocity curve 112, a voltage curve 114 and a current curve 116 for a second disc drive. As in FIG. 5, the parking operation begins with the heads at an outermost radius on the discs at the beginning of division 1. As the parking operation is initiated with a RETRACT command, the velocity curve 112 shows the actuator to be accelerated towards the park position and then more gradually decelerated out to about the beginning of division 6, where the actuator finally contacts the latching arrangement at a dotted line denoted as 120. As with the velocity curve 102 of FIG. 5, the velocity curve 112 of FIG. 6 shows that the velocity of the actuator at contact is sufficiently reduced so as to provide acoustic noise and motion within predetermined, acceptable limits. After the actuator reaches the park position, the velocity of the actuator remains at 0, as expected.

Examination of the voltage curve 114 shows that a negative amount of voltage is applied to the coil during the parking operation and this is a result of the negative electrical offset of the control circuitry. However, despite this offset, the actuator is still effectively parked by about the beginning of the sixth division. The current curve 116 of FIG. 6 also shows that current flowed in a negative direction while the heads were parked.

Figure 7:
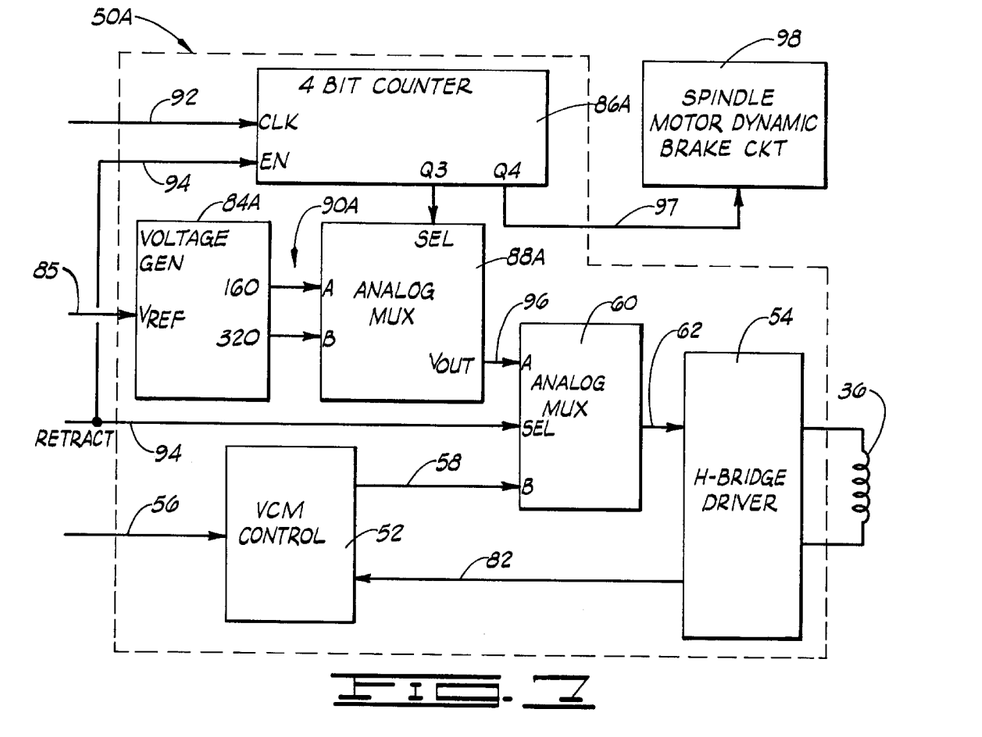
FIG. 7 is a block diagram of the VCM control circuitry of FIG. 2, showing a second embodiment of apparatus of the present invention.

Having now concluded the discussion concerning FIGS. 3–6 for the first embodiment of the present invention, reference will now be directed to FIG. 7, which shows a second embodiment for the VCM control circuit 50 of FIG. 3, designated generally as 50A. It will be understood that this second embodiment is presented to briefly illustrate the construction and operation of such a circuit for a disc drive having characteristics different from those presented for the disc drive of FIGS. 3–6. More particularly, FIG. 7 is provided to illustrate an embodiment for the VCM control circuit 50A for a 2 disc, 1.8" diameter disc drive having a relatively low spindle inertia, a flex circuit bias null point well outside the inner radius of the discs and a low radial force component from head aerodynamic effects. In contrast to the relatively high spindle inertia disc drive of FIGS. 3–6 which provided about 800 milliseconds of time in which to park the actuator, the disc drive considered with respect to FIG. 7 has a much lower spindle inertia and requires parking of the actuator in less than around 350 milliseconds.

Referring now to FIG. 7, it will be recognized that the VCM control circuit 50A is very similar in construction and operation to the VCM control circuit 50 presented in FIG. 3, with the exception that a voltage generator circuit 84A provides two voltages, one at 160 mV and the second at 320 mV, for selection by an analog mux 88A in response to timing pulses from a counter 86A. As will be recognize the operation of the circuit of FIG. 7 results in a voltage profile comprising two equal duration steps, the first at 160 mV and the second at 320 mV to the analog mux 60, for application to the h-bridge driver 54, with each step (or clock interval) having a duration of around 150 milliseconds. The selection of two voltage steps in the profile for the disc drive of FIG. 7 is in part governed by the shorter time available to park the heads, and the voltage levels selected are further governed by the additional energy necessary to park the heads due to the bias forces on the actuator. Of course, the counter 86A is shown as a four-bit counter with the Q3 output providing the selection input S0 to the analog mux 88A and the Q4 output engaging the spindle dynamic brake circuit 98; however, it will readily be recognized that any number of n-bit counter configurations could be used and that the use of a four-bit counter (in both FIGS. 3 and 7) is merely for purposes of illustration, not limitation.

Figure 8:
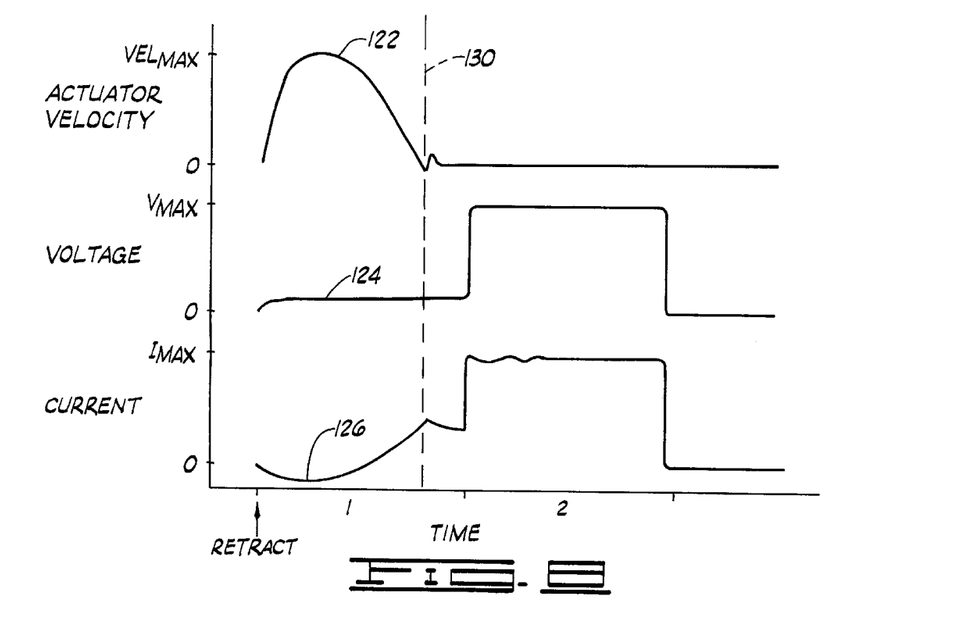
FIG. 8 is a graphical representation of the velocity of the actuator of FIG. 2 as well as voltage and current waveforms passing through the coil of FIG. 7 during a head parking operation for a particular 2 disc, 1.8" diameter disc drive.

Referring now to FIG. 8, shown therein is a graphical representation of net velocity, voltage and current for the disc drive considered with reference to FIG. 7, the graph of FIG. 8 being similar to FIGS. 5 and 6, previously discussed above. As represented on the x-axis of FIG. 8, two divisions are provided, showing the two clocked intervals used in the profile, so that the analog mux 88A of FIG. 7 outputs 160 mV during the first division and 320 mV during the second division.

As shown in FIG. 8, the velocity of the actuator is represented by velocity profile curve 122 which begins in a position having the heads located at an outermost diameter of the discs. The velocity profile curve 122 indicates an initial acceleration of the actuator towards the park position, followed by a deceleration so as to reach the park position and engage a magnetic latch (not shown) at an acceptable velocity at a point denoted by a dotted line 130. Likewise, during the head parking operation, the net voltage across the coil 36 as well as the net current through the coil 36 are represented by voltage curve 124 and current curve 126, respectively.

Having concluded the discussion concerning FIGS. 7 and 8, additional considerations in shaping a voltage profile for use during the parking of a disc drive actuator will now be addressed. As a first consideration, in accordance with the foregoing discussion it is generally desirable to complete the retraction of the actuator in a short amount of time; that is, before the spindle motor rotational velocity has decreased to the point where an air-bearing surface is no longer available to support the heads above the discs and, in the case where the spindle motor back EMF is used as a generator (as in a power down sequence), before the voltage generated by the spindle motor drops below an acceptable rail voltage. Accomplishing the retraction of the actuator in too short an amount of time, however, will generally result in undesirable amounts of acoustic noise and motion, as described above. The amount of time available in which to retract the actuator, of course, is a function of the spindle motor speed and inertia of the spinning discs, and will vary significantly among different disc drive designs. It has generally been found, however, that typical times available in which to retract the actuator for various configurations of disc drives have varied from around 200 milliseconds to more than 800 milliseconds. It follows that, with the present trend towards smaller disc drives having greater areal densities, the trend will be towards shorter retraction times in the future. It is essential to first understand the total time budget available in which to retract the actuator and to ensure the retraction takes place within the allotted time frame.

Another consideration is the effect of the bias forces that act upon the actuator and the extent that these bias forces tend to force the actuator into the park position. For example, in the 4 disc, 2.5" diameter disc drives discussed with reference to FIGS. 3–6, the bias forces were found to be sufficient to cause retraction of the heads from a position at the outermost radius of the disc without any additional application of voltage across the VCM coil. The operation of the circuit as described therein thus worked to limit the velocity from these forces to a greater extent than for other disc drives having a smaller inwardly directed bias force, such as the 2 disc, 1.8" diameter drive discussed with reference to FIGS. 7 and 8. In both cases, however, the circuits disclosed herein operate so as to reduce the effect of these forces and to eliminate unacceptable acoustic noise and head motion upon parking of the actuators. Of course, the bias forces exerted upon an actuator across the radius of the discs are well understood by those skilled in the art and are a function of several factors, including the masses in the system, the rotational speed of the discs, the spring forces provided by the flex circuit and the location of the actuator pivot point with respect to the discs. Generally, it has been found that the greater the bias forces tend to force the actuator inward towards the park position, less drive current will be necessary to drive the actuator to the park position. It has been therefore found advantageous in such cases to use, as the allotted retraction time will permit, a voltage profile having a larger number of voltage steps with lower voltage levels during the first part of the profile. Conversely, for drives with a less significant bias force towards the park position, more drive current will generally be necessary to drive the actuator to the park position and less velocity limiting will occur during the retraction of the actuator. A voltage profile for retraction of the actuator in such drives can readily be devised to limit the velocity, however, and generally for such drives voltage profiles having fewer steps and greater voltage levels in each step have been found useful, as provided for example by the circuit of FIG. 7.

A third consideration in developing an actuator retraction voltage profile is the specified current recommended by the coil manufacturer in order to assure full retraction of the actuator. By way of illustration, for a coil having a specified retract current of 20 mA and a maximum VCM coil resistance of about 14 ohms, a voltage level of at least (20)(14)= 280 mV would generally be desirable as the final voltage in the voltage profile to ensure proper retraction of the heads in all circumstances. It has been found useful, however, to provide the final voltage step in the generated profile with a voltage in excess of the calculated required value and then select the voltage levels for the preceding steps to be less than this calculated required value. The selected values for the voltage profile, of course, should be chosen in view of the other considerations presented above.

It will be recognized in view of the foregoing discussion that the present invention is not limited to the particular sizes and characteristics of disc drives discussed herein, but rather may be applied to any disc drive that uses a voice coil motor to position the actuator. Further, the voltage profiles provided herein are provided for purposes of illustration and not limitation, and that any number of voltage profiles may be used, as long as the voltages presented change over time and increase in magnitude. That is, provided a sufficient number of voltage levels and time intervals, a voltage profile approximating a linear ramp, an exponential ramp, or even an S-shaped ramp may be used. It is also expressly contemplated that negative voltages instead of positive voltages might be applied to the driver circuit, depending upon its construction, so that references to "increasing" or "increased" voltage will be understood to include the use of negatively increasing as well as positively increasing voltages in the profile.

Finally, it will be understood that for purposes of disclosing the preferred embodiments above, constant time intervals have been shown for the voltage profile; however, this has been shown by way of illustration and not limitation, as it is explicitly contemplated that a voltage profile having non-uniform time intervals could be constructed and used as provided above.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive having a disc and an actuator adjacent the disc, the disc having a plurality of concentric data tracks, the actuator having a coil of a voice coil motor, the disc drive having control circuitry for positioning the actuator with respect to a selected data track, the control circuitry including driver circuitry for driving the voice coil motor to position the actuator through the controlled application of current to the coil, the disc drive comprising:

voltage generation means for generating a plurality of discrete voltage levels; and retraction means, responsive to the voltage generation means, for applying the discrete voltage levels as a series of timed, stepped voltages of increased magnitude to the driver circuitry to retract the actuator to a park position, the retraction means applying the series regardless of the initial radial position of the actuator, the retraction means causing the driver circuitry to operate as a voltage source for the coil so that voltages established across the coil by the driver circuitry are maintained regardless of the flow of current through the coil as the actuator is retracted.

2. The disc drive of claim 1, wherein the actuator is retracted by the retraction means in response to a retract command.

3. The disc drive of claim 1, wherein the series of timed, stepped voltages is selected so that the actuator reaches the park position at a sufficiently low velocity as to produce acoustic noise below acceptable limits.

4. The disc drive of claim 1, wherein the velocity of the actuator is limited by back emf generated by the coil in response to inwardly directed bias forces upon the actuator.

5. The disc drive of claim 1, wherein the plurality of discrete voltage levels comprises voltages of 0, 5, 10, 20, 40, 80, 160 and 320 millivolts, respectively.

6. The disc drive of claim 1, wherein the plurality of discrete voltage levels comprises voltages of 160 and 320 millivolts, respectively.

7. An improved disc drive of the type having a disc, an actuator adjacent the disc and a spindle motor for operably rotating the disc, a voice coil motor for positioning the actuator with respect to the disc in response to signals provided by voice coil motor control circuitry, the disc including concentric data tracks and a park zone, the actuator having a coil of the voice coil motor and a transducer positioned with respect to the concentric data tracks during rotation of the disc and positioned with respect to the park zone when the disc is not rotated, the voice coil motor control circuitry including a voice coil motor driver circuit for driving the voice coil motor, wherein the improvement comprises:

voltage generation means for generating a plurality of discrete voltage levels; and retraction means, responsive to the voltage generation means, for applying the discrete voltage levels as a series of timed, stepped voltages of increased value to the voice coil motor driver circuitry to move the transducer to the park zone, the retraction means applying the series regardless of the initial radial position of the transducer, the retraction means causing the voice coil motor driver circuitry to operate as a voltage source for the coil so that voltages established across the coil are maintained regardless of the flow of current through the coil as the actuator is retracted.

8. A disc drive having a disc, a spindle motor for operably rotating the disc at a nominal operational speed, an actuator adjacent the disc and control circuitry for positioning the actuator with respect to the disc, the disc having concentric data tracks and a park zone, the actuator having a transducer positioned by the control circuitry with respect to a selected data track during rotation of the disc at the nominal operational speed, the actuator including a coil of a disc drive voice coil motor, the control circuitry including a driver circuit for providing current to the actuator coil, the disc drive comprising:

indication means for indicating receipt of a command to halt rotation of the disc at operational speed;

voltage generation means for generating a plurality of voltages at discrete, dc voltage levels;

timing means for providing a series of timing signals;

selection means, connected to the indication means, the voltage generation means and the timing means, for outputting a voltage profile to the driver circuit to move the transducer to the park zone in response to the indication means, the voltage profile comprising the voltages generated by the voltage generation means arranged as a series of timed, sequential voltage steps, each step having an increased dc voltage level and a duration determined by the timing signals generated by the timing means;

wherein the voltage profile is outputted to the driver circuit regardless of the initial radial position of the transducer; wherein the driver circuit maintains voltage levels across the coil in response to the voltage profile regardless of the direction and magnitude of the flow of current through the coil as the transducer is retracted; and wherein the voltage profile is selected so that acoustic noise generated by the retraction of the transducer remains below an acceptance threshold.

9. The disc drive of claim 8, wherein the velocity of the transducer is limited by back emf generated by the coil in response to inwardly directed bias forces upon the actuator.

10. The disc drive of claim 8, wherein the plurality of voltage levels comprises voltages of 0, 5, 10, 20, 40, 80, 160 and 320 millivolts, respectively.

11. The disc drive of claim 8, wherein the plurality of voltage levels comprises voltages of 160 and 320 millivolts, respectively.

12. In a disc drive of the type having a disc, a spindle motor for operably rotating the disc at a nominal operational speed, an actuator adjacent the disc and control circuitry for positioning the actuator with respect to the disc, the disc having concentric data tracks and a park zone, the actuator having a transducer positioned by the control circuitry with respect to a selected data track during rotation of the disc at the nominal operational speed, the actuator including a coil of a disc drive voice coil motor and the control circuitry including a driver circuit for providing current to the voice coil motor, an improved method for parking the actuator comprising the steps of:

generating a plurality of voltages at discrete voltage levels;

providing a sequence of timing signals;

using the plurality of voltages and the sequence of timing signals to generate a voltage profile, the voltage profile comprising the plurality of voltages arranged as a series of timed, sequential voltage steps, each step having an increased voltage level and a duration determined by the timing signals; and using the voltage profile to retract the actuator to a park position regardless of the initial radial position of the transducer, comprising the step of establishing voltage levels across the coil in response to the voltage profile, the voltage levels maintained regardless of the magnitude and direction of the current passing through the coil as the actuator is retracted.

13. The method of claim 12, wherein the step of generating a plurality of voltages comprises generating voltages of 0, 5, 10, 20, 40, 80, 160 and 320 millivolts, respectively.

14. The method of claim 12, wherein the step of generating a plurality of voltages comprises generating voltages of 160 and 320 millivolts, respectively.

* * * * *